Patented Oct. 6, 1953

2,654,668

UNITED STATES PATENT OFFICE 2,654,668

COMPOSITION FOR STIMULATING THE GROWTH OF PLANTS

Dominique Weibel, Nidau-Bienne, Switzerland, assignor to Chim A. G., Basel, Switzerland, a company of Switzerland No Drawing. Application December 13, 1948, Serial No. 65,075. In France December 22, 1947

3 Claims. (Cl. 71—2.5)

It is known that the physiology of plants can be influenced by means of synthetic organic substances termed plant hormones or hetero-auxins. Up to this time, such plant hormones have been employed for increasing the percentage of rooted cuttings, preventing preharvest fall of fruit, obtaining parthenocarpic fruit, killing weeds selectively in graminaceae fields, and delaying germination of potato tubers.

Such processes require the employment of more or less high percentages of plant hormones but in all cases the percentages correspond to pathologic amounts acting brutally on the physiology of plants and causing abnormal phenomena.

On the contrary, any efforts displayed up to this time for employing plant hormones for accelerating and strengthening the natural process of production of vegetable tissues, particularly root tissues, have led only to unequal and often conflicting results.

I have now found that such bad results are to be ascribed either to the fact that plant hormones have been employed at very low concentrations giving rise to no physiological injury but unable to induce any substantial propagation of tissues, or to the fact that plant hormones have been employed at concentrations liable to result in an efficient propagation of tissues but also to cause pathologic phenomena due to a physiological lack of balance.

It is an object of this invention to provide new compositions which are desirable in efficiently promoting normal development of plant tissues without causing physiological injuries.

Such growth stimulating compositions are mainly characterized in that they contain both one or more plant hormones and dry yeast, or yeast previously degraded through plasmolysis or autolysis; desirably they may further contain one or more substances adapted to prevent propagation of micro-organisms in the final compositions or solutions thereof as prepared for use; however, when dry compositions are prepared, it is not absolutely necessary to incorporate such inhibitors therein.

Vitamins that are available in yeast, insofar as they have been identified as yet, are:

Group I:
  Vitamin B1
  Vitamin B2
  Vitamin B3
  Vitamin B4
  Vitamin B5
  Vitamin B6
  Vitamin B7
  Vitamin H' (para-amino-benzoic acid)
  Vitamin PP (nicotinic amide)
  Pantothenic acid
Group II:
  Meso-inositol (Bios I)
  Biotin or vitamin H (Bios II)
  Amino-butyric acid (Bios III)
Group III:
  Vitamin E (tocopherol)
  Vitamin K (methylnaphthoquinone)
  Provitamins D2 and D3

Group I is the vitamin complex B (water-soluble vitamins). Group II or the bios group is considered as acting on cell multiplication. Group III is the group of liposoluble vitamins.

Besides the aforesaid factors, yeast contains albumins, fats and carbohydrates. Autolysis at a low temperature purports to degrade albumin materials to readily assimilable, amino-acids having a low molecular weight, without destroying the vitamins.

It is known at this time in pharmacology that in yeast, whether autolysed or not, the major part of vitamins and bios is not in free form but is in the form of compounds having a complicated structure, constituting ferment systems, and that the simultaneous presence of all these factors of the complex B and the bios groups results in synergistic effects far more desirable than the effects of these vitamins taken separately.

Hence, the desirability of yeast extracts is attributed (a) to the fact that vitamins and bios are available therein as complex compounds representing their ideal form from the standpoint of biologic function, and (b) to the fact that all natural factors therein have a synergistic effect.

In the preferred embodiment, my compositions further contain sugars which play the part of rendering the hormones (which may be insoluble hormones) more readily soluble in water and more readily assimilable.

As plant hormones, known synthetic hormones and hetero-auxins may be employed, such as, for example, β-indolacetic acid, β-indolpropionic acid, β-indolbutyric acid, α-naphthylacetic acid, phenylacetic acid, β-naphthoxyacetic acid, ring-substituted phenoxy-acetic acids, alkaline salts of the acids listed above, amides or esters thereof; moreover, those various plant hormones may be employed singly or in admixtures.

The yeast products employed according to this invention are those in which have been preserved through the preparation thereof most of the biologically active substances contained in the starting fresh yeast. In this connection I may employ:

1. Yeasts of any origin whatever (baking yeast, barm, yeast from the manufacture of alcohol, yeast propagated in wood sugar solutions, and so on) dried at a low temperature or dried at higher temperatures by a substantially instantaneous process such as atomisation with hot air. The yeasts may be of various species such as Saccharomyces cerevisiae or Torula.

2. Particularly yeast derivatives produced by a more or less strong degradation whereby a plant treated therewith can more readily assimilate substances contained in the yeast.

Degradation may be effected through a mere plasmolysis by any appropriate physical means such as heat, or through an autolysis in the presence of chemicals such as sodium chloride or saccharose, or in the presence of biological active products such as papain.

Dried yeast or plasmolysates (containing only non-degraded, insoluble ingredients) are preferably employed in compositions for dry treatment of plants, while the yeast autolysates can be employed equally in compositions for dry treatment or in compositions to be applied as aqueous solutions.

It is generally necessary to sterilize the yeast products by adding inhibiting substances thereto both for securing perfect keeping where liquid autolysates are employed, and for preventing development of bacteria or cryptogams detrimental to germination on the surface of seeds treated. For sterilization purposes, small amounts of known antiseptics are added, comprising inter alia bacteriostatic or bactericide substances and fungostatic or fungicide substances. In actual practice, it is desirable to employ only those antiseptics which are compatible with the medium in which they are incorporated, i. e. which do not cause alterations therein detrimental to the activity and process of use of the final growth stimulating composition. As examples of preferred antiseptics, I may mention ortho-hydroxy-quinolin neutral and acid sulphates, organo-mercury derivatives such as phenyl-mercury nitrate and methoxy-ethyl mercury chloride, and thio-urea.

As sugars preferably employed, I may cite reducing sugars, particularly glucose.

This invention further comprises a process for the manufacture of compositions as above described; among other features, a characteristic feature of this process is the manner of incorporating insoluble plant hormones employed in the form of free acids, so as to facilitate their dissolution in water.

According to this invention, it is desirable to work as follows:

The water insoluble plant hormone or hormones to be employed are dissolved in a suitable volatile solvent such as acetone, ethyl alcohol or ethyl acetate for example. Powdered solid sugar is impregnated with the solution thus prepared, and the solvent is removed at a low temperature. The hormone-sugar thus obtained is adapted to dissolve in water without leaving any insoluble residue. It may then either be dissolved in concentrated yeast product solutions or intimately mixed with dried yeast product.

It should be understood that, although preferable, it is not necessary previously to form a hormone sugar, as hormone and sugar may also be incorporated directly in the composition.

The amount of yeast product incorporated in the composition has practically no upper limit; as a matter of fact, good results are still secured where the composition contains 100,000 parts by weight of yeast product (reckoned as dry material) for 1 part by weight of plant hormones. In actual practice, a proportion of the order of 100 to 10,000 parts per 1 part of hormones is generally satisfactory.

As to the proportion of sugar, it is preferably of about 10 to 1000 parts by weight per 1 part by weight of hormones.

The compositions according to this invention may further contain fillers if they are to be employed for dusting, diluents, further growth stimulants, for instance inorganic oligo-elements such as manganese salts for example manganese sulphate or chloride, iron salts for example iron sulphates or citrates, zinc salts for example zinc lactate or acetate, molybdenum salts such as ammonium molybdate, boron derivatives such as sodium borate or boric acid, rare earth metal salts either pure such as uranium earths (for example residues obtained after extraction of radium or uranium), various vitamins, wetting agents, fixing agents, insecticides, fungicides etc.

The compositions produced according to this invention may be either liquid where nondried yeast products are used, or solid where dry yeast products are employed.

The liquid form is desirable after proper dilution either for treating seeds by dipping or spraying, or for sprinkling or watering cultivated plants.

The dry form may be employed for treating seeds by dusting, or embedding roots when transplanting.

In order to illustrate the manner of carrying my invention into effect, I will give a few examples which are not limiting.

Example 1.—In 500 g. of crude, beer yeast autolysate containing 30 percent by weight of dry materials and stabilized by addition of 0.5 percent of ortho-hydroxy-quinolin neutral sulphate and 2 percent of thio-urea, I dissolved 10 g. of glucose containing 2 g. per kg. of $\beta$-indolacetic acid incorporated by impregnation in acetonic solution.

The product thus obtained was employed as a 1 percent aqueous solution thereof.

Such a solution was sprayed on spring wheat seeds by an amount of 5 to 7 kgs. per 100 kgs. of seeds.

A more rapid spearing or shooting of wheat was found. On harvesting, treated wheat stalks were found to be longer by 10 cm. as an average than untreated specimens, straw had a larger diameter and ears were heavier. The wheat grain yield was larger by 27 percent and the straw yield by 21 percent.

Example 2.—Starting from 500 grams of beer yeast autolysate purified by centrifuging and concentrated in a high vacuo to a dry material content of 50 percent, I added 0.5 percent of ortho-hydroxy-quinolin sulphate and 2 percent of thio-urea.

I added subsequently:

1. 10 grams of glucose containing 5 grams per kilogram, of $\alpha$-naphthylacetic acid incorporated therein by impregnation in acetone solution.

2. 20 grams of manganese sulphate.

The liquid thus obtained was used as a 0.25 percent aqueous solution for treating beetroot seed glomerules.

For this purpose, 15 kilograms of sugar-beetroot seed glomerules were soaked for 24 hours in 20 litres of said solution, then dried and sown.

On harvesting it was found that as compared with untreated specimens, the total weight of leaves and roots was larger by 28 percent, the weight increase of roots alone being 24 percent.

*Example 3.*—1 percent of ortho-hydroxy-quinolin sulphate and 5 percent of thio-urea were added to 100 grams of baking yeast autolysate dried through atomisation.

The product was then admixed intimately with:

1. 10 grams of glucose containing 2 grams per kilogram, of α-naphthylacetic acid incorporated therein by impregnation in acetonic solution.
2. 1400 grams of talcum;

150 g. of the mixed powder thus formed were dusted on 100 kilograms of potato tubers before planting them.

On harvesting, the weight of tubers gathered on the field in which treated tubers were planted was larger by 38 percent than on a comparison field of the same area in which untreated tubers were planted.

*Example 4.*—To 100 grams of baking yeast dried through atomisation after addition of 2 grams of manganese sulphate, I added 4 grams of glucose containing 0.5 percent of α-naphthylacetic acid, and 96 grams of talcum.

20 kilos of sugar-beetroot seed glomerules treated with the dry composition thus prepared were sown over and hectare (10,000 sq. m.).

An earlier spearing or shooting was found as compared with beetroots from untreated seeds; the foliage was darker and withstood dryness better. On harvesting, the weight of roots showed an increase of 28 percent as compared with beetroots from untreated seeds.

I claim:

1. A plant growth - stimulating composition which substantially consists of at least one plant hormone in admixture with about 100 to 10,000 times its weight of a yeast autolysate and an antiseptic capable of preventing propagation of detrimental micro-organisms in the composition.

2. A plant growth - stimulating composition which substantially consists of at least one plant hormone, about 100 to 10,000 parts by weight of a yeast autolysate per each part of plant hormone, an antiseptic capable of preventing propagation of detrimental micro-organisms in the composition, and about 10 to 1000 parts by weight of a reducing sugar per each part of plant hormone.

3. A plant growth - stimulating composition which substantially consists of at least one plant hormone in admixture with a yeast autolysate, an antiseptic capable of preventing propagation of detrimental micro-organisms in the composition, and a reducing sugar.

DOMINIQUE WEIBEL.

References Cited in the file of this patent

UNITED STATES PATENTS

| Number | Name | Date |
|---|---|---|
| 1,411,088 | Guy | Mar. 28, 1922 |
| 1,978,201 | Heuer | Oct. 23, 1934 |
| 2,205,807 | Bjorksten | June 25, 1940 |
| 2,229,948 | Weil | Jan. 28, 1941 |
| 2,291,693 | Colla | Aug. 4, 1942 |
| 2,392,811 | Eweson | Jan. 15, 1946 |

FOREIGN PATENTS

| Number | Country | Date |
|---|---|---|
| 484,981 | Great Britain | May 9, 1938 |
| 492,596 | Great Britain | Sept. 19, 1938 |
| 591,951 | Great Britain | Sept. 3, 1947 |

OTHER REFERENCES

Kogl et al: "Plant Growth Substances" XIII; 2-physiol Chem. 288, pp 90–103 (1934), cited from Chem. Abstracts (1935), page 195.

"Phytohormones" by Went and Thimann. The MacMillan Co. (New York) 1937, pages 194 to 202, 237 to 239.